Patented July 19, 1949

2,476,500

UNITED STATES PATENT OFFICE 2,476,500

SYNTHESIS OF N-SUBSTITUTED AMIDES

John E. Mahan, Bartlesville, Okla., assignor to Phillips Petroleum Company, a corporation of Delaware No Drawing. Application December 17, 1945, Serial No. 635,605

6 Claims. (Cl. 260—561)

This invention relates to a liquid phase catalytic process for the production of N-substituted amides from nitriles, amines and water.

The uses of N-substituted amides are increasing in many fields, and a suitable method for their quantity production on an economical basis is much needed. Thus, diethyl formamide is one of the few solvents for "nylon"; diethyl nicotinic amide is used in pharmaceuticals; dimethyl formamide is a good selective solvent for acetylene and other unsaturated hydrocarbons. These are only a few of the many uses to which compounds of this type are now applied.

Prior art methods for the production of N-substituted amides are largely confined to classical procedures and have been used only on a limited scale. One of these is the reaction of acid chlorides with primary and secondary amines. Another well known process for the preparation of these compounds is the interaction of isonitriles with organic acids. A third is a Grignard reaction where the Grignard reagent is brought into reaction with an isocyanate to produce the N-substituted amide.

Among the numerous disadvantages of these methods are the need for expensive or difficultly obtainable reagents, the use of involved procedures which are difficult of commercial application, and realization of relatively low yields.

More recently it has been shown that the interaction of nitriles, amines and water can be brought about in the vapor phase if a dehydrating catalyst is used. While this method shows superiority over earlier procedures it is subject to the obvious disadvantages inherent in vapor phase operations. Such disadvantages include particularly the necessity for very large volumes of catalysts for a given plant throughput, and a quite rapid deactivation of catalyst necessitating short operating cycles and frequent catalyst regeneration.

It is an object of the present invention to provide an improved process for the synthesis of N-substituted amides.

Another object of the invention is to make possible a carrying out of such a synthesis in the liquid phase.

A further object is to react a nitrile, an amine, and water, all in the liquid phase, over a highly specific catalyst whereby an N-substituted amide is produced in near-theoretical yields.

Various other objects and advantages of the invention will be apparent, to one skilled in the art, from the accompanying disclosure and discussion.

I have now found that N-substituted amides can be efficiently and economically produced by reacting nitriles, amines and water in the liquid phase if a synthetic silica-alumina gel type catalyst containing only a minor portion of alumina is used. My process may be applied to aliphatic, aromatic and heterocyclic nitriles in reaction with aliphatic primary and secondary amines and water. The particular methods used in preparing the catalysts of this invention will be described in detail hereinafter.

In preferred embodiment, the nitrile, amine and water are mixed and passed in liquid phase over the synthetic silica-alumina catalyst at an elevated reaction temperature lying within the range of 200 to 800° F. and at a superatmospheric pressure adequate to maintain the reaction mixture in liquid phase. This pressure is generally within the range of 300 to 1200 pounds per square inch gauge. A flow rate of from about 0.5 to 4.0 liquid volumes feed per volume catalyst per hour should be used, the exact value, of course, depending upon the particular reactants, the temperature and pressure conditions selected, and the yield per pass which is desired.

The relative proportions of the three reactants may be varied within wide limits. It is, however, preferable to employ the nitrile in a molar excess of either of the other reactants, and preferably in molar excess of both the other reactants taken together.

The silica-alumina synthetic gel catalysts which are a feature of the present process are characterized by their chemical composition, their physical properties, and specific methods of preparation, which account for their catalytic activity. Although these catalysts are broadly referred to as silica-alumina compositions it is important to define further their origin, physical structure, and chemical composition in order to differentiate the catalysts active in the present process from naturally occurring minerals which contain some of the same components, or simple physical admixtures of the same components, which are distinctly inferior or inoperative in carrying out the present synthesis. The catalysts of this invention are of such a nature that the reaction may be effected readily in liquid phase, thus taking advantage of the superiority of such reaction conditions.

The catalysts of this invention may be described as synthetic activated gels. If the gel structure is not produced, or is destroyed during preparation, the physical and catalytic properties of the resulting materials are unsatisfactory. The most active compositions contain silica and alumina in proportions different from those usually found in naturally occurring materials comprising these components. Suitable silica-alumina catalysts for use in this invention may be prepared by methods described by McKinney in United States Patents 2,142,324 and 2,147,985, wherein their use as olefin polymerization catalysts is disclosed.

In general, these catalysts are prepared by first forming a hydrous silica gel or jelly from an alkali-silicate and an acid, washing soluble material from the gel, treating or activating the gel with an aqueous solution of a suitable aluminum salt, and subsequently washing and drying the treated material. In this manner, a part of the aluminum, presumably in the form of a hydrous oxide or loose hydroxide compound formed by hydrolysis, is selectively adsorbed by the hydrous silica, and is not removed by subsequent washing. This selective adsorption is attested by a decrease in the aluminum content of the activating solution as well as a decrease in pH as the activation progresses. A satisfactory silica-alumina catalyst is prepared by treating a wet or partially dried hydrous silica gel with an aluminum salt solution, such as a solution of aluminum chloride or sulphate, and subsequently washing and drying the treated material. Whether prepared by this method or by some modification thereof, the catalyst will contain a major portion of silica and a minor portion of alumina. The alumina will generally not be in excess of 10% by weight, and is preferably between about 0.1 and 2% by weight.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and form a silica hydrogel of proper consistency. Thus, phosphoric, acetic, nitric, and boric acids may be used in certain instances. The gel formed should be acidic and should be partially dried and washed free of excess acid prior to activation, and the extent of drying is carefully controlled since the eventual catalyst activity is apparently somewhat dependent on the maintenance of the hydrous oxide composition prior to the activation treatment. The salt solution for activation may be prepared from any water-soluble hydrolyzable salt of aluminum, with the sulphate or chloride being preferred. Other alternate salts include acetates and nitrates. The adsorption of the hydrous aluminum oxide by the silica gel proceeds smoothly with hydrated silica gel, whereas with dried silica the adsorption and the activation may be much less satisfactory. Active catalysts are preferably rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and alumina.

Modifications may be made in the foregoing procedure and catalysts of suitable activity may result. One obvious alternative is the addition of the aluminum salt to the silicate before gelation. This method enables the incorporation of greater proportions of aluminum oxide, but activity may not be proportional to increasing aluminum oxide contents above about 1 to about 15 weight per cent so that little is gained by the modification and the proper degree of salt and acid removal may be more difficult. Non-uniform materials usually result from the mechanical mixing of hydrous alumina and silica gels, so that catalysts prepared in this manner are less satisfactory. Other means of accomplishing the preparation may be devised, however, in view of the foregoing description.

By utilizing the above described catalyst I am able to carry out the reaction at moderate temperatures in the liquid phase whereby ultimate yields of N-substituted amides of 90 to 95% or more based on the original nitrile content of the feed are obtained. The N-substituted amide is the principal product of the reaction, and the only other material produced in substantial quantities is the unsubstituted amide, which I recover from the reaction effluent and recycle. The unsubstituted amide is thus ultimately converted to the substituted amide. Of course, if one desires, the unsubstituted amide may be utilized for other purposes with a corresponding decrease in yield of N-substituted amide.

While temperatures within the range of 200 to 800° F. may be employed it is ordinarily satisfactory to operate between 350 to 550° F. As previously emphasized, it is essential that sufficient pressure be maintained so as to insure a liquid reaction mixture at the temperatures prevailing in the catalyst chamber.

In the case of higher aliphatic nitriles, and in the case of some amines, the solubility of water in the organic materials may limit the applicable concentrations severely. While operation with two liquid phases is permissible and satisfactory, I ordinarily prefer to utilize a fourth component in which both the water and the organic liquids are miscible. This fourth component should be substantially inert under the conditions used. While various liquid solvents are available for this purpose, I prefer to use pyridines, especially the picolines.

Carbonaceous deposits gradually build up on the catalyst in normal operation and from time to time the catalyst may be reactivated. This may be done in a manner well known in catalytic processes by passing through the catalyst a controlled stream of oxygen-containing gas and removing the deposits by combustion. It is a particular advantage of liquid phase operation, however, that such reactivation is required at much less frequent intervals than when the reaction is effected in the vapor phase.

The following example is illustrative of one method of practicing my process to produce N-diethyl acetamide.

Acetonitrile, diethylamine and water were reacted in the liquid phase over a silica-alumina gel catalyst containing not over 2% alumina. This catalyst was prepared by introducing sodium silicate solution into an excess of aqueous sulfuric acid. The resulting hydrous silica gel was water-washed free of soluble material and partially dried. After this partial drying step the gel was activated by soaking in an aqueous solution of aluminum sulphate to effect adsorption of hydrous alumina on the silica gel. After washing and drying, the catalyst was ready for use. The reactor was maintained under a pressure of 1000 pounds per square inch gauge and at temperatures between 480 and 550° F. The flow rate was 0.5 liquid volumes total feed per bulk volume of catalyst per hour. The effluent was stripped of acetamide and unchanged diethylamine by distillation, and these were added to the feed for recycling. A per-pass yield of 37.3% of N-diethylacetamide was obtained, while the ultimate yield of this product, due to recycling of the unsubstituted amide, was 95% based on acetonitrile used.

While the invention has been described with particular reference to the use of simple, i. e. unsubstituted, saturated aliphatic nitriles, especially acetonitrile, it is likewise applicable to simple aromatic nitriles, unsaturated aliphatic nitriles, nitriles having as part of their structure a heterocyclic ring, and certain substituted nitriles whose substituents are resistant to hydrolysis. The nitriles usually employed have the general formula RCN where R is an alkyl, alkenyl, aryl, aralkyl, or aralkenyl group. The amines which may be employed are primary and secondary aliphatic amines, which may or may not be substituted with radicals substantially non-reactive under the conditions of use.

I claim:

1. A process which comprises reacting together at a pressure sufficient to maintain the reaction mixture in the liquid phase and at a temperature in the range of 200 to 800° F. an unsubstituted saturated aliphatic nitrile, water, and an amine selected from the group consisting of unsubstituted aliphatic primary amines and unsubstituted aliphatic secondary amines, in contact with a catalyst consisting of a synthetic precipitated silica gel subsequently promoted by a minor proportion of adsorbed hydrolytic alumina; said catalyst having been prepared by precipitating hydrous silica gel by introducing an alkali silicate solution into an excess of an acid, water-washing free of soluble material and partially drying to an extent so limited that the hydrous oxide composition of the gel is maintained, activating the resulting hydrous acidic silica gel with an aqueous solution of a hydrolyzable aluminum salt and thereby causing adsorption of hydrous alumina on the silica gel in an amount corresponding to from 0.1 to 2% of alumina by weight, and water-washing and drying at moderate temperatures the treated gel; and recovering an N-substituted amide as a product of the process.

2. A process according to claim 1, wherein the reaction is effected at temperatures within the range of 350 to 550° F.

3. An improved process for the production of an N-substituted amide from water and the corresponding unsubstituted saturated aliphatic nitrile and unsubstituted non-tertiary aliphatic amine, which comprises passing same in liquid phase, the nitrile being in molar excess over the amine and the water, through a bed of a solid granular catalyst hereinafter defined, at a flow rate of from 0.5 to 4.0 liquid volumes reactants per volume of catalyst per hour, at a temperature of from 350 to 550° F., and at a liquefying super-atmospheric pressure of up to 1200 pounds per square inch gauge; said granular catalyst comprising silica promoted with from 0.1 to 2% by weight of adsorbed hydrolytic alumina and prepared by passing an aqueous alkali silicate into an excess of an aqueous mineral acid and allowing the mixture to set to a silicic acid gel, washing said gel with water and only partially drying same to form a hydrous acidic silica gel, contacting said silica gel with an aqueous solution of a hydrolyzable aluminum salt at a temperature approximating the boiling point of said solution to activate said gel by hydrolytic adsorption of alumina thereon, washing said activated gel with water to remove free acid and salts, and finally drying said activated and washed gel at moderate temperatures to form hard granules; recovering from the resulting reaction mixture unreacted amine and unsubstituted amide and recycling same to the reaction, and recovering from said reaction mixture the N-substituted amide so produced in a yield of at least 95% based on the nitrile charged to the process.

4. A process according to claim 1, in which said nitrile and amine are incompletely miscible with water, and in which sufficient of a fourth liquid comprising a pyridine inert under the reaction conditions and in which said nitrile, amine and water are miscible is used to give a homogeneous solution.

5. A process according to claim 4, in which said fourth liquid comprises picolines.

6. A process for synthesizing N-diethyl acetamide which comprises passing a liquid mixture of acetonitrile, diethylamine and water over the catalyst hereinafter defined, at a flow rate of about 0.5 liquid volume per volume of catalyst per hour, at a temperature of about 480 to 550° F., and at a liquefying pressure of about 1000 pounds per square inch gauge, said catalyst being a synthetic silica-alumina gel prepared by precipitating hydrous silica gel by introducing an alkali silicate solution into an excess of an acid, water-washing free of soluble material and partially drying to an extent so limited that the hydrous oxide composition of the gel is maintained, activating the resulting hydrous acidic silica gel with an aqueous solution of a hydrolyzable aluminum salt and thereby causing adsorption of hydrous alumina on the silica gel in an amount corresponding to from 0.1 to 2% of alumina by weight, and water-washing and drying at moderate temperatures the treated gel.

JOHN E. MAHAN.

REFERENCES CITED

The following references are of record in the file of this patent:

UNITED STATES PATENTS

| Number | Name | Date |
|---|---|---|
| 2,357,484 | Martin | Sept. 5, 1944 |
| 2,421,030 | Mahan | May 27, 1947 |